United States Patent Office 3,309,991
Patented Mar. 21, 1967

3,309,991
REPRODUCTION PROCESS BY MEANS OF HEAT
Hildegard Haydn and Edith Weyde, both of Leverkusen, Germany, assignors to Agfa Aktiengesellschaft, Leverkusen, Germany, a corporation of Germany
No Drawing. Filed Jan. 25, 1962, Ser. No. 168,799
Claims priority, application Germany, Feb. 7, 1961, A 36,672; Apr. 8, 1961, A 37,157
4 Claims. (Cl. 101—149.4)

This invention relates to a new method for producing reproductions or copies by the action of heat.

It is known to reproduce a text or design original as a relief on thin foils, by bringing the foil into contact with an original and exposing it to heat rays. This effect is produced because the patterns which consist for example of printers ink or of silver produced by photographic methods have a stronger absorbing action to heat rays than the surrounding areas, and as a result the surface structure of the thin foil is imagewisely influenced, corresponding to the variations in heat intensity.

The relief image is formed because the foils are heated to a higher degree at areas of the pattern and thus expand more, and on rapid cooling no longer reassume their original form. The thinner the foils, the more clearly and sharply is the relief seen. The material of the foils is of no importance, except for the fact that it must have the property of being expanded by heat. However, foils also exist, for example those of polyethylene or polyamide, which present melting phenomena as well as the relief formation. On such foils, the image of the original is seen as a clouding, and very thin foils can even melt completely through, so that here the image of the original is to be detected in the form of holes in the foil. It is important for these processes that the heating and cooling of the foil and original take place very quickly, for example by their being conducted past an infrared light source.

According to the reproduction methods described in the published German patent application D 9971, foils are used which melt through at the heated areas. According to British patent specification No. 777,819, substances which melt are applied to woven fabric or foils, the heated areas becoming transparent. The molten material can then also be transferred to a lithographic plate, which can be used for the litho printing or offset printing process.

It has now been found that text or design originals consisting of materials such as printing ink or silver which absorb heat rays more strongly than their surroundings, can be reproduced by exposing foils to radiant heat in the presence of fusible or sublimable substances, which either penetrate in a molten state easily into the reception foils or are taken up by the melting foil.

A relatively large number of products are suitable as such substances, for example alcohol-soluble and fat-soluble dyestuffs, such as:

Sudan red: Schultz, vol. 1, 7th ed., No. 976; Color of the alcoholic solution with red fluorescence—red.
Sudan R: Schultz, vol. 1, 7th ed., No. 149; Color of the alcoholic solution—red.
Sudan III: Schultz, vol. 1, 7th ed., No. 532; Color of the alcoholic solution—red.
Sudan IV: Schultz, vol. 1, 7th ed., No. 541; Color of the alcoholic solution—red.
Sudan CB: Schultz, vol. 1, 7th ed., No. 127; Color of the alcoholic solution—orange.
Sudan II: Schultz, vol. 1, 7th ed., No. 92; Color of the alcoholic solution—yellowish-red.
Sudan I: Schultz, vol. 1, 7th ed., No. 33; Color of the alcoholic solution—yellow.
Sudan G: Schultz, vol. 1, 7th ed., No. 31; Color of the alcoholic solution also in fat—yellow.
Sudan brown: Schultz, vol. 1, 7th ed., No. 115; Color of the alcoholic solution—brown.
Nigrosine: Schultz, vol. 1, 7th ed., No. 986; Color of the alcoholic solution—blue.
Para blue: Schultz, vol. 1, 7th ed., No. 987; Color of the alcoholic solution—blue.
Brilliant-blue CC: Schultz, vol. 1, 7th ed., No. 991; Color of the alcoholic solution—blue.
Nigrosine base: Schultz, vol. 1, 7th ed., No. 985; Color of the alcoholic solution—bluish-black.
Benzine blue: 1,4-di-isobutylamino-anthraquinone.

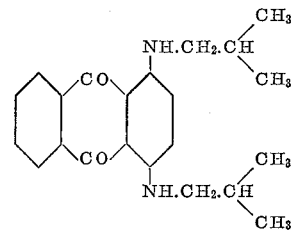

Ceres blue: Colour Index No. 44065.

Substances which contain a hydrophobic and a hydrophilic group, in the molecule such as tannin, dinaphthyl-methane sulphonate (Tamol), alkyl sulphonates, benzene sulphohydrazides (Porofore), are also suitable as well as natural or artificial waxes such as highly polymerized polyglycols (polywaxes) with molecular weights between approximately 1300 and 1600, stearic acid, stearyl alcohol or other higher fatty acids and higher alcohols.

The various fusible or sublimable products described above can be applied in the form of a layer either to the reception foil or to the original. In the latter case the layer consisting of this substance can either be applied to the original, in which a silver image has already been produced, or can be applied prior to the processing to the photographic material later serving as original. According to another embodiment of the invention, said fusible or sublimable products can be incorporated into a layer of the original material. In this case the readily sublimable or readily meltable substances are already present in the photographic layers at the time of production.

If an original treated in this manner is conducted in contact with a support material serving as copying material past an infrared light source, the dark areas of the original are heated substantially more strongly than the light portions and some of the sublimable or meltable substances migrate onto the copying material, so that a laterally reversed image of the original is formed thereon. All originals which have been prepared by photographic methods are suitable for the process of the invention. Mention is to be made, in particular, of those photographic layers which lead directly to a positive image, such as photographic emulsions, which lead by the principle of the Herschel effect to a direct positive image, or for example photographic emulsions which work according to the principle of the silver salt diffusion process. With the last-mentioned process, it is particularly advantageous for the readily sublimable or fusible substances to be added to the image-receiving layer which is not light-sensitive. In this case, it is also possible to use those substances which are strongly colored or are not compatible with the photographic silver halide emulsion. It is also possible for dyestuffs to be added in relatively large quantities to the image-receiving layer. This does not impair the formation of silver images in these layers by the conventional transfer method.

If the originals, for example the positives which are produced by the silver salt diffusion process and which contain the aforementioned readily sublimable or meltable substances, in contact with the thermoplastic reception foil, consisting for example of polyamide or polyethylene, are moved past an infrared light source, some of the added dyestuff at the silver-containing zones which are more strongly heated migrates to the foil. If foils which melt at a sufficiently low temperature are used, the foil is softened at these more strongly heated areas and so that it takes up the dyestuff. The image contained on the foil can therefore no longer be removed by wiping. In this way, there can be obtained transparent positives, the colors of which depend on the nature of the added dyestuff.

If dodecyl alcohol is used, the transferred dodecyl alcohol image is preferably dyed with a dyestuff powder in order to make the image visible. Both negative and positive silver images can be used as original for the process according to the invention.

The plastic reception foils which can be used for the process of the invention must consist of thermoplastic plastics, such as polyvinylidene chloride and copolymers thereof with vinyl chloride and vinyl acetate, polyamides, especially polycaprolactam, which are formed by the reaction of a polybasic acid, advantageously a dibasic acid such as adipic acid or sebacic acid, with a polyamine, advantageously a diamine such as hexamethylene diamine, polyethylene, preferably high-pressure polyethylene, rubber hydrochloride, polystyrene, styrene-isobutylene copolymers, styrene-acrylonitrile copolymers, polyvinyl chloride, vinyl chloride vinyl acetate copolymer, polyvinyl acetals, cellulose ethers and esters, such as cellulose propionate-butyrate, ethyl cellulose, as well as polyesters, in particular those based on terephthalic acid and ethylene glycol, polycarbonates particularly those of bis-hydroxy phenyl alkanes and the like.

The heat-treated foils can either be used themselves as prepared recordings or as intermediate originals for further copying purposes, for example, in order to produce light prints or stencils for different printing processes. Further reproductions may be made from the heat-treated foil by applying electrostatically charged dyestuff powders.

A number of typical uses of the process are more fully described in the following examples.

*Example 1*

A polyethylene foil (high pressure polyethylene Lupolene of Badische Anilin- & Soda-Fabrik AG, Ludwigshafen (Rhine) with a thickness of 0.01 mm. is coated with a mixture of 3 g. of Sudan red No. 976, Schultz, "Dyestuff Table," vol. 1, 7th ed., in 100 cc. of alcohol or water. The dyestuff can be distributed easily and uniformly on the surface of the foil and adheres with adequate strength. This coated foil is now brought into contact with a printing original and radiant heat is caused to act thereon for a short time. At those areas of the foil which are in contact with the dark areas of the original an initial melting of the polyethylene foil takes place the dyestuff penetrating into the foil. After the foil has been separated from the original, the dyestuff which has not fused is wiped off, for example with alcohol. The image of the original is then seen in the polyethylene support in a brilliant red color.

This process can be used for various purposes. For example, a transparent positive can easily be prepared from an original and prints can be made from the said positive.

*Example 2*

The procedure according to Example 1 can also be utilised for producing colored transparencies, Sudan dyestuffs in different color shades being used.

For this purpose, 3 partial color separation records can be prepared for example in the usual manner from a color negative, these records being brought into contact with suitably dyed polyethylene foil and heated. By superposition of 3 polyethylene foils which are positively dyed yellow, blue and red, a colored reproduction is obtained from the color negative which is used. The colored foil can be prepared for example in the following manner: 1.5 g. of Sudan red No. 976, Schultz, vol. 1, 7th ed., is dissolved in 100 cc. of alcohol and the foil is coated therewith. For the yellow foil, it is possible to use 1.8 g. of Sudan I No. 33, Schultz, vol. 1, 7th ed., in 100 cc. of alcohol and for the blue foil, 1.8 g. of Ceres blue Colour Index No. 44065 in 100 cc. of alcohol.

The dyestuffs taken-up by the polyethylene foil can be removed again from the foil by solvents which penetrate into the polyethylene foil, such as dimethyl formamide. Since the polyethylene foil can absorb relatively large quantities of dyestuff, it is possible from such a foil, by slowly dissolving out the dyestuff, to prepare a relatively large number of prints, for example in the manner of the known spirit printing.

A laterally reversed image of the original is obtained on the polyethylene foil after heating. If the foil, after removing the excess dyestuff (as described above) is now clamped in one of the conventional devices used for spirit printing, and if dimethyl formamide is used instead of alcohol as solvent, it is possible readily to prepare about 100 non-reversed images from the foil on normal writing paper.

*Example 3*

A hard polyvinyl chloride foil (Suprotherm of Kalle AG, Wiesbaden) having a thickness of 0.1 mm. is coated on one side with a solution of stearyl alcohol. If this foil is brought with the layer side into contact with the original to be copied and if it is heated for a short period, a stronger heating is produced at the black areas of the original. The foil melts at these areas and the substance applied penetrates into the plastic foil. In this way, there is produced a surface change by comparison with the unheated areas. A foil produced in this manner, which carries the laterally reversed positive image of the original, can be further processed in various ways. For example, if such a foil is rubbed with an alcohol-soluble dyestuff-wax mixture, the dyestuff only passes onto the unheated areas. In this way, there is obtained a non-laterally reversed negative of the original.

Instead of using stearyl alcohol, it is also possible to use natural or artificial waxes, for example highly polymerized polyglycols (polywaxes) 1550 or higher fatty acids, such as stearic acid.

The process is therefore especially suitable for the production of prints of photocopies which are non-laterally reversed negatives. Such non-laterally reversed, negative photocopies are obtained for example when the originals are copied by means of optical systems and a reversal prism onto a conventional highly sensitive photographic paper.

*Example 4*

A polyamide foil (with a base of Ultramid of Badische Anilin- & Soda-Fabrik AG, Ludwigshafen (Rhine), is coated with a solution of dinaphthylmethane-sulphonate (Tamol). If a foil prepared in this way is brought into contact with an original and heated for a short time, the material applied fuses into the foil at the dark areas of the original, while it adheres without any change to the foil at the other areas. If such a foil is now dusted with electrostatically charged powder particles, such as sulphur, carbon black, plastic powder or dyestuff powder, these particles only adhere to the areas at which the applied substance has fused into the foil. With suitable powders, which can contain dyestuffs and which if required can be mixed with synthetic resin, it is possible for the dyestuff to be stuck to the foil by a subsequent brief heating.

The laterally-reversed positive image thus obtained, can for example be duplicated by a spirit printing process. However, the powder image of the foil can also be fixed on another support, for example paper, by brief heating. In this way, there is obtained a non-reversed copy of the original. The coloring of the foil by means of electrostatically charged powder can take place several times, so that in this way it is also possible to obtain a relatively large number of copies.

*Example 5*

A foil of a polyester based on terephthalic acid and phthalic acid, ethylene glycol (Hostaphan of Kalle AG, Wiesbaden) is coated with a suspension of 3 g. of Para blue (Schultz, vol. 1, 7th ed., No. 987) in 100 cc. of alcohol or water. The dyestuff can be distributed easily and uniformly on the surface of the foil and adheres satisfactorily. This coated foil is brought into contact with a printing original and exposed to a source of radiant heat for a brief period. At the areas of the foil which are in contact with the dark areas of the original, there is an initial melting of the polyester foil, the dyestuff penetrating into the latter. After the foil has been separated from the original, the dyestuff which has not fused in is wiped off, for example with alcohol. The image of the original is then seen in the polyester support, in a brilliant blue color.

This process can be used for various purposes. For example, it is possible in this way readily to prepare a transparent positive from an original and to make light prints therefrom.

*Example 6*

A photographic silver halide emulsion is used, which leads directly to positive images by the principle of the Herschel effect. Information concerning the production of such emulsions are found for example in British Patent No. 748,681. 10 g. of dodecyl alcohol in the form of an emulsion are added per litre of such an emulsion. After exposure and normal processing, these layers are dried and are conveyed past an infra-red light source in contact with a cellulose acetate foil. At those areas of the original which contain silver, some of the added dodecyl alcohol is transferred to the cellulose acetate foil, and there is seen thereon the weak image of the original as a positive, non-reversed image. If this image is treated with a dyestuff powder, this powder remains adhering to the areas which are coated with a vapour of dodecyl alcohol.

*Example 7*

To an image-receiving layer, such as used for the silver salt diffusion process and containing for example carboxymethyl cellulose as layer-bonding agent, is added a substance which is deeply colored, for example Sudan red. A suitable solution for the production of such an image-receiving layer can be prepared according to the following recipe:

| | |
|---|---|
| Carboxymethyl cellulose 5 percent _____cc__ | 1000 |
| Colloidal silver sulphide _____g__ | 0.01 |
| Sodium thiosulphate ($5H_2O$) _____g__ | 25 |
| Sudan red, suspended in 100 cc. of a mixture of water and alcohol (Sudan red No. 976, Schultz, vol. 1, 7th ed.) _____g__ | 5 |

In processing, such a layer is conveyed in contact with an image-wise exposed silver halide layer and in an apparatus usual for the process through a developer which may for example have the following composition:

| | |
|---|---|
| Water _____cc__ | 1000 |
| Sodium hydroxide _____g__ | 10 |
| Anhydrous sodium sulphite _____g__ | 80 |
| Hydroquinone _____g__ | 15 |
| 1-phenyl-3-pyrazolidone _____g__ | 1 |
| Potassium bromide _____g__ | 1 |

The silver image of the copied original is obtained on the image-receiving material, which is deep red in color. After drying the positive, this can be processed in various ways:

(A) The positive, in contact with a thermoplastic foil, for example polyethylene, is conveyed past an infra-red light source. At the areas containing silver, the dyestuff is heated to such an extent that it transfers to the foil and is fused therein. This foil can now be used for example as an original for light prints.

(B) The positive, in contact with a foil which is difficut to melt, for example a polyester foil, is moved past an infra-red light source. At the silver containing areas, the red dyestuff is transferred to the foil, which can be used as a stencil for spirit printing.

The process of the invention is suitable for the production of various reproductions or copies. For example, the images prepared by the process according to the invention can either themselves be used as finished recordings or as intermediate originals for further copying for example for producing light prints or stencils for different printing processes. It is also possible to produce further reproductions or copies of the heat-treated foil by applying electrostatically charged dyestuff powders.

Having thus described our invention, we now state that we believe our invention to be capable of numerous variations. For example, for the reception foil any thermoplastic polymer is suitable, that is, all thermoplastic polymers which are softened repeatedly by repeated heating and hardened with cooling. This term applies to polymers whose change upon heating is essentially physical and not chemical. The preferred range of the softening temperature of these polymers is between 80 and 200° C.

The fusible and sublimable organic substances should melt or sublime in the temperature range between 50 and 200° C. The chemical structure of these compounds is not especially critical, the compound suitable for the desired special process is selected according to the requirement of the reproduction process in which said compound is to be used.

What is claimed is:

1. A process for producing a duplicate copy of an original print which contains an image formed of a substance that absorbs infrared rays which comprises
   (a) placing a face of the original print into contact with a face of a reception sheet formed of a thermoplastic resin that has a softening point between 80 and 200° C. and is selected from the group consisting of polyamides, rubber hydrochloride, polyvinyl acetals, cellulose ethers, cellulose esters, polyesters, and polymers of ethylene, vinylchloride, vinylidene chloride and styrene, said sheet being about 0.01 mm. thick, both of which are in contact with a stratum of a distinguishable organic substance that has a melting or subliming point lower than the softening point of the reception sheet uniformly distributed at the contacting faces of the original print and the reception sheet,
   (b) uniformly exposing the said assembly of print, reception sheet and distinguishable organic substance to infrared radiation for such a period that the heat developed in the image portions of the original print by absorption of the infrared radiation softens the portions of the thermoplastic reception sheet that are adjacent to the heated image portions of the original print and causes the distinguishable organic substance to migrate into the thus softened portions of the reception sheet, and
   (c) separating the original print from the reception sheet so that said sheet preferentially retains the organic substance in portions thereof that correspond to the image of the original print, to produce a duplicate copy of the original print.

2. A process as defined in claim 1 in which the distinguishable organic substance is a substance of the group consisting of organic dyes, alkyl sulfonates, higher fatty acids, higher alcohols, tannin, dinaphthyl methanesulfonate, benzenesulfohydrazides, and natural and synthetic waxes.

3. A process as defined in claim 1 in which the distinguishable organic substance is applied to the face of the reception sheet before the exposing step, and is visible, and after that sheet is separated from the print the sheet is wiped with solvent for the organic substance to remove the non-migrated portion of the substance from the reception sheet, thereby leaving a visible image in the reception sheet.

4. A process as defined by claim 1 in which the organic substance is a dye and the separated reception sheet only containing the preferentially retained portions of the dye is pressed successively against a plurality of copy sheets in the presence of a solvent for that dye, to make spirit-type copies.

References Cited by the Examiner

UNITED STATES PATENTS

| | | |
|---|---|---|
| 2,256,093 | 9/1941 | Land. |
| 2,503,758 | 4/1950 | Murray. |
| 2,721,513 | 10/1955 | Marron. |
| 2,721,821 | 10/1955 | Hoover _____ 101—426 X |
| 2,770,534 | 11/1956 | Marx. |
| 2,808,777 | 10/1957 | Roshkind _____ 101—149.5 X |
| 2,954,311 | 8/1960 | Vander Weel ____ 101—149.4 X |
| 3,033,677 | 5/1962 | Abbott et al. _____ 101—149.4 X |
| 3,094,417 | 6/1963 | Workman. |

DAVID KLEIN, *Primary Examiner.*